United States Patent [19]

Hareyama et al.

[11] E Re. 29,676

[45] Reissued Jun. 20, 1978

[54] MATRIX RESISTORS FOR INTEGRATED CIRCUIT

[75] Inventors: Kyuichi Hareyama; Shuzi Nakazawa, both of Tokyo, Japan

[73] Assignee: Nippon Electric Company, Limited, Tokyo, Japan

[21] Appl. No.: 729,287

[22] Filed: Oct. 4, 1976

Related U.S. Patent Documents

Reissue of:

[64] Patent No.: 3,906,430
Issued: Sep. 16, 1975
Appl. No.: 501,791
Filed: Aug. 29, 1974

[30] Foreign Application Priority Data

Sep. 3, 1973 Japan ..... 48-99100

[51] Int. Cl.[2] ..... H01C 1/01; H01C 1/16

[52] U.S. Cl. ..... 338/320; 338/295; 357/51

[58] Field of Search ..... 338/320, 295; 357/51

[56] References Cited

U.S. PATENT DOCUMENTS

| | | | |
|---|---|---|---|
| 3,419,767 | 12/1968 | Dahlberg | 357/51 |
| 3,458,847 | 7/1969 | Waits | 338/320 |
| 3,718,780 | 2/1973 | Oya | 357/51 |
| 3,849,757 | 1/1974 | Khammous | 338/320 |

*Primary Examiner*—E. A. Goldberg
*Attorney, Agent, or Firm*—Hopgood, Calimafde, Kalil, Blaustein & Lieberman

[57] ABSTRACT

A plurality of resistance elements arranged in an n-row by n-column matrix are of substantially equal lengths and widths. The sides of the resistance elements which are in common rows and columns are colinear and first and second electrodes are provided at substantially the same location on each resistance element. The electrodes of the resistance elements are connected in a manner such that a series connection is formed between resistance elements belonging to different adjacent columns in the matrix between two sets of n external terminals.

6 Claims, 11 Drawing Figures

MATRIX RESISTORS FOR INTEGRATED CIRCUIT

Matter enclosed in heavy brackets [ ] appears in the original patent but forms no part of this reissue specification; matter printed in italics indicates the additions made by reissue.

The present invention relates generally to resistors in an integrated circuit device, and more particularly to pairs of such resistors.

Recently integrated circuits have become larger in size and have necessitated sophisticated geometric alignment and characteristic matching in the fabrication of constituent elements such as, for example, a pair of resistors on a substrate. In a practical fabrication process, it is important to establish matching of the relative accuracy among resistance elements as well as thermal matching of those elements. Resistance elements that are thoroughly controlled with respect to such matching and alignment are used, for example, to constitute a resistor ladder network in a digital-to-analog converter or to set the gain of an operational amplifier.

Although it has been essential to achieve high relative accuracy in the fabrication of pairs of resistors on a substrate, the prior art approach has failed to realize substantial relative accuracy because deviation among resistance values has inevitably resulted because of such factors as misalignment in the cutting of the photomask art work, the aberration of lenses used in forming a set of reticles, difference in photomask alignment, and misalignment in the diffusion or vapor deposition process. Misalignment in the cutting of the photomask art work seriously and adversely affects the relative accuracy with respect to resistance because a photomask is used when forming the diffusion region or deposition layer upon which the resistance values of the resistors fabricated depends.

Therefore, it is an object of the invention to provide pairs of resistors in an integrated circuit device having high relative accuracy with respect to resistance.

An integrated circuit device according to the present invention comprises nxn numbers of substantially rectangular resistance elements having first and second electrodes, the resistance elements being equal both in width and in length. The resistance elements are arranged in an n-row by n-column matrix (where n stands for an integer larger than 1), and the first and second electrodes of each resistance element are respectively provided at the same portions in each resistance element. The upper sides of all the resistance elements which belong to the same row, the lower sides of all the resistance elements of the same row, the right sides of all the resistance elements belonging to the same column and the left sides of all the resistance elements of the same column are each colinear. A number n of first terminals are each electrically connected with the first electrode of the resistance element of the first row, and a number n of second terminals are each electrically connected with the second electrode of the resistance element of the n-th row. The second electrode of each one resistance element belonging to each row is connected to the first electrode of each one resistance element belonging to an adjacent row but belonging to a different column, thereby to form a series connection of n resistance elements belonging to different columns between each one of the first terminals and each one of the second terminals.

The other objects, features and advantages of the invention will become more apparent from the following detailed description taken in conjunction with the accompanying drawings wherein.

Figure 5:
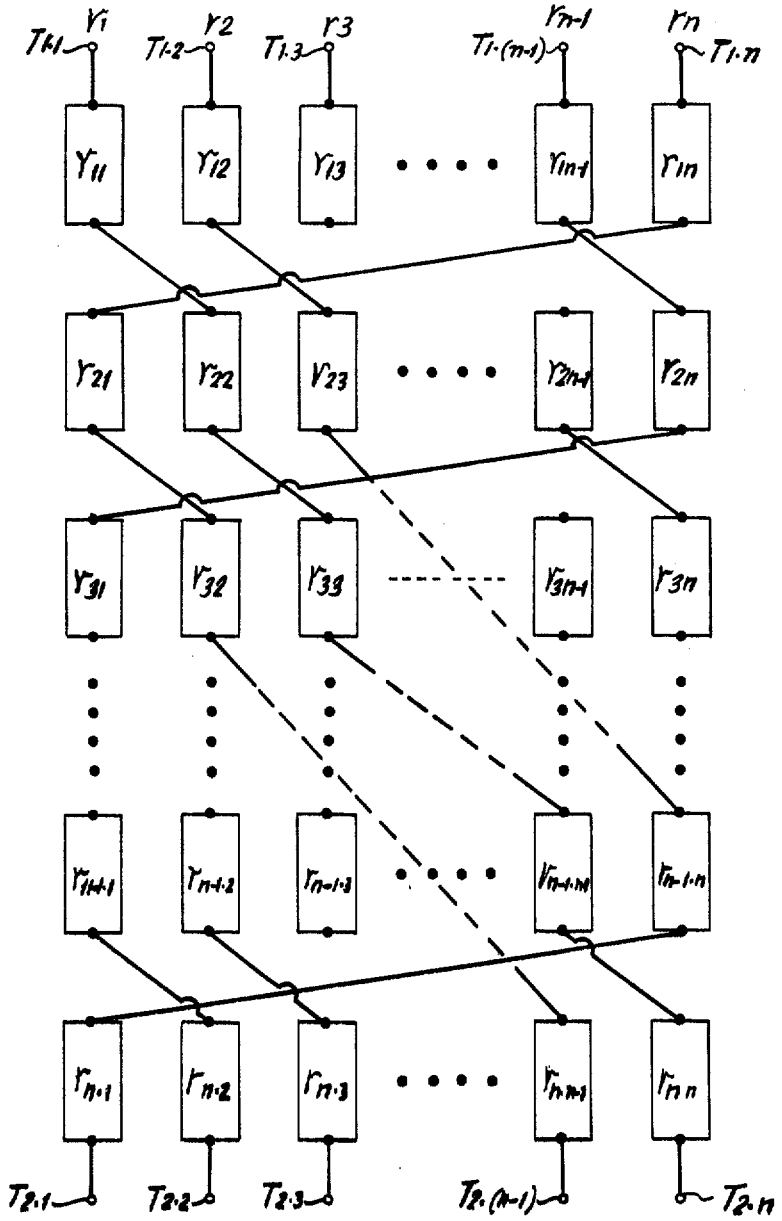

FIG. [4] *4A–4G* is a diagram showing the steps of process for making resistors according to the invention; and FIG. 5 is a plan view showing an arrangement of resistors according to another embodiment of the invention.

Figure 1:
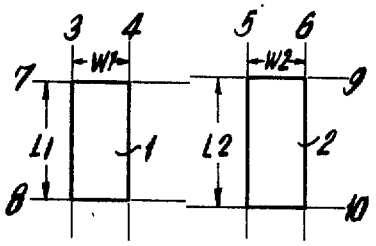
(PRIOR ART) FIG.1
FIGS. 1 and 2 are plan views showing a pair of resistors fabricated according to a prior art method.
Figure 2:
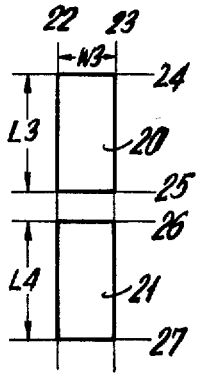
(PRIOR ART) FIG.2

With reference to FIGS. 1 and 2, there are shown in plan view a pair of rectangular resistors formed with the aim to establish high relative accuracy for resistance values. In FIG. 1, if the width across two opposing sides 3 and 4 of a diffused resistance element 1 is W1, and the width across two opposing sides 5 and 6 of another resistance element 2 is W2, and the length across two opposing sides 7 and 8 of the resistance element 1 is L1, and the length across two opposing sides 9 and 10 of the resistance element 2 is 12, then the following condition holds.

$$W1/W2 = 1 + \alpha_1$$

$$L2/L1 = 1 + \beta_1$$

where $\alpha_1$ and $\beta_1$ denote deviations ascribed to the previously discussed mismatching and misalignment factors such as misalignment in mask cutting.

The deviation $\Delta R1$ between resistance values R1 and R2 of resistance elements 1 and 2 may be given as:

$$\Delta R1 = (R2 - R1)/(R2 + R1)$$

Thus:

$$\begin{aligned}\Delta R1 &= (L2/W2 - L1/W1)/(L2/W2 + L1/W1)\\ &= (L2/W2 \cdot W1/L1 - 1)/(L2/W2 \cdot W1/L1 + 1)\\ &\doteqdot \{(1 + \alpha_1)(1 + \beta_1)\}/\{1/(1 + \alpha_1)(1 + \beta_1) + 1\}\\ &\doteqdot (\alpha_1 + \beta_1)/2\end{aligned}$$

In FIG. 2, assume that a pair of diffused resistance elements 20 and 21 on a semiconductor substrate have resistance values R20 and R21 respectively. These resistance elements have their sides colinear with straight lines 22 and 23 respectively. In this structure, there is no deviation in width between the two resistance elements, that is, the widths of the two resistance elements are equally W3. Assume that the length across sides 24 and 25 of the resistance element 20 is L3, and the length across sides 26 and 27 of the resistance element 21 is L4. Then there is a deviation $\beta_2$ between lengths L3 and L4. Hence, a resistance deviation $\Delta R2$ exists between the two resistance elements due to $\beta_2$. That is, $L4/L3 = 1 + \beta_2$ and $\Delta R2 = (R21 - R20)/(R21 + R20)$. Thus:

$$\begin{aligned}\Delta R2 &= (L4/W3 - L3/W3)/(L4/W3 + L3/W3)\\ &= (L4 - L3)/(L4 + L3)\\ &= \beta_2/(2 + \beta_2)\\ &\doteqdot \beta_2/2\end{aligned}$$

Figure 3:
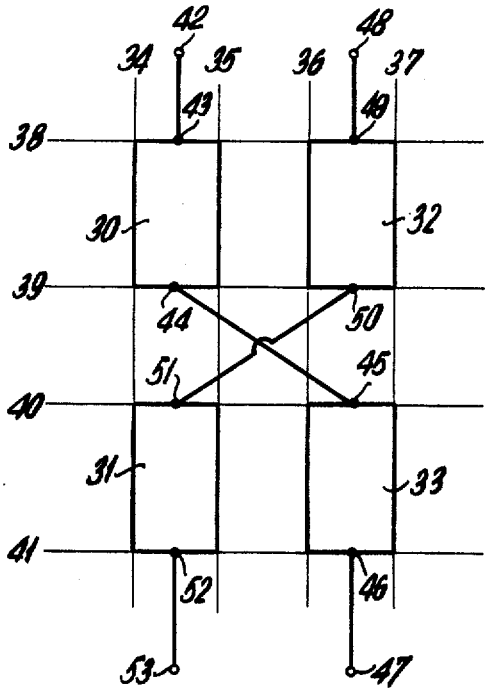
FIG. 3 is a plan view showing an arrangement of resistors according to one embodiment of the invention.

With reference to FIG. 3, there is shown in plan view one embodiment of the invention, in which diffused resistance elements 30 and 33 of rectangular shape and with widths and lengths equal to each other, are formed on a semiconductor substrate. The resistance elements 30 and 31 have their opposing sides colinear with straight lines 34 and 35, respectively. Hence, there is no deviation in width between the two resistance elements 30 and 31; that is, the widths of the two elements are equally W31. In the same sense, there is no deviation in width between sides 36 and 37 of the resistance elements 32 and 33; that is, the widths of the two elements are equally W32. The resistance elements 30 and 32 have their top and base sides colinear with straight lines 38 and 39 respectively, with the result that there is no deviation in length between the two elements 30 and 32; that is, the lengths of the two elements are equally L31. Similarly, there is no deviation in length between the other opposing sides 40 and 41 of the resistance elements 31 and 33; that is, the lengths of the two elements 31 and 33 are equally L32. Assume that the resistance values of resistance elements 30 through 33 are R30 through R33 respectively and that there are conditions R30 + R×= RA and R31 + R32 = RB. The resistance RA is obtained by connecting a terminal 42 to one electrode 43 of the resistance element 30, the other electrode 44 to one electrode 45 of the resistance element 33, and the other electrode 46 thereof to the terminal 47. The resistance RB is obtained by connecting a terminal 48 to one electrode 49 of the resistance 32, the other electrode 50 to one electrode 51 of the resistance element 31, and the other electrode 52 to a terminal 53.

Assume that a deviation $\beta_3$ exists between lengths L31 and L32, and a deviation $\alpha_3$ exists between widths W31 and W32 due to the aforementioned reasons. That is, L32/L32 $= 1 + \beta_3$ and W31/W32 $= 1 + \alpha_3$. Then if ΔR3 = (RA − RB)/(RA + RB), $$\Delta R3 = \frac{\{(R30 + R33) - (R31 + R32)\}}{\{(R30 + R33) + (R31 + R32)\}}$$

$$= \frac{\left\{\left(\frac{L31}{W31} + \frac{L32}{W32}\right) - \left(\frac{L32}{W31} + \frac{L31}{W32}\right)\right\}}{\left\{\left(\frac{L31}{W31} + \frac{L32}{W32}\right) + \left(\frac{L32}{W32} + \frac{L31}{W32}\right)\right\}}$$

$$= \frac{\left\{\left(1 + \frac{L32}{L31} \cdot \frac{W31}{W32}\right) - \left(\frac{L32}{L31} + \frac{W31}{W32}\right)\right\}}{\left\{\left(1 + \frac{L32}{L31} \cdot \frac{W31}{W32}\right) + \left(\frac{L32}{L31} + \frac{W31}{W32}\right)\right\}}$$

$$= \frac{\{1 + (1 + \beta_3)(1 + \alpha_3) - (1 + \alpha_3) - (1 + \beta_3)\}}{\{1 + (1 + \beta_3)(-1 + \alpha_3) + (1 + \alpha_3) + (1 + \beta_3)\}}$$

$$= \frac{\alpha_3\beta_3}{(4 + \alpha_3\beta_3 + 2\alpha_3 + 2\beta_3)}$$

$$\doteqdot \frac{\alpha_3\beta_3}{4}$$

Table 1 below shows the comparative values of relative accuracy of a pair of resistors formed according to the invention and according to the prior art. Table 1 evidences the fact that the relative accuracy is much higher in the resistors of the invention than in those of the prior art.

Figure 4A:
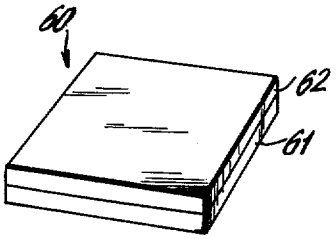
Figure 4D:
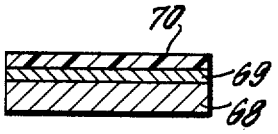
Figure 4B:
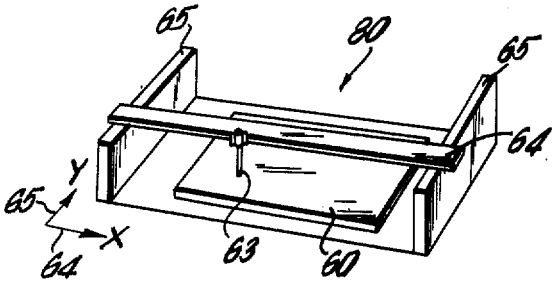

For further illustrating the invention, the process of making the resistors of the invention will be described by referring to FIG. 4. As shown in FIG. 4(A), the material for a photomask art work is, for example, of a strip film 60 made of a Mylar base 61 coated with a resin 62 of red color. As shown in FIG. 4(B), a desired mask pattern is provided by cutting the resin 62 of the strip film 60, generally by the use of a X−Y coordinator 80 which comprises a tool 63 of diamond or sapphire held by a scale 64 aligned in the direction of the X-axis. The tool 63 can be moved along the scale 64. The scale 64 is movable on a scale 65 aligned in the direction of the Y-axis. Then, the resistance elements 30 and 31 (FIG. 3) are disposed with their sides colinear with a straight line 34 in such manner that the tool 63 is fixed at a given coordinate position on the X-axis scale 64 on the coordinate graph, the scale 64 is moved along the Y-axis scale 65, and thus the resin 62 on the strip film 60 is cut along a straight line 34' FIG. 4(C). Similarly the resistance elements 30 and 32 shown in FIG. 3 are disposed with their sides colinear with a straight line 38 in such manner that the scale 64 is fixed at a given coordinate position on the Y-axis scale 65, the tool 63 is moved along the X-axis scale 64, and thus the resin 62 on the strip film 60 is cut along a straight line 38'. Therefore, as shown in FIG. 4(C), the strip film 60' has a bright portion 66 and a dark portion 67. The bright portion 66 is the cut-out portion of resin 62 which is to form a resistance element. The resultant photomask pattern formed by art work is reduced by known photographic techniques to provide a master reticle such as, for example, a glass mask. A diffused resistance element may be made in the following manner by the use of a glass mask. An oxide film 69 is formed on a semiconductor substrate 68 by thermal oxidation technique, and a photoresist 70 is deposited over the entire surface of the film 69, as shown in FIG. 4(D).

Figure 4E:
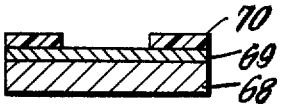
Figure 4F:
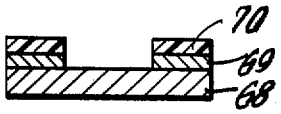
Figure 4C:
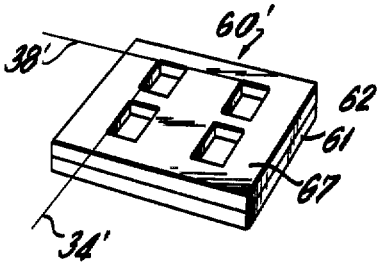
Figure 4G:
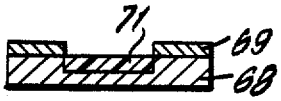

The photoresist 70 is exposed to light through the glass mask obtained by steps (A) to (C) of FIG. 4, and the photoresist on a semiconductor substrate which is to become a resistance element is removed by etching as shown in FIG. 4(E). The oxide film 69 is selectively etched by using the residual photoresist as a mask *FIG. 4F*. After the photoresist 70 is thoroughly removed, an impurity is diffused thereinto and thereby a resistance layer 71 is formed as shown in FIG. 4(G). This resistance layer may be formed by ion implanation instead of impurity diffusion. In a known manner, aluminum electrodes are bonded respectively on the resistance element at both sides of the resistance layer and are connected by wirings as shown in FIG. 3, whereby a pair of resistors are fabricated with high relative accuracy.

Thus, all resistance elements are formed by selectively diffusing impurities into the same semiconductor substrate. When they are formed together with other active elements or passive elements in the same semiconductor substrate, all of these resistance elements are fabricated in the same region and are isolated from the other elements by a P-N junction in the substrate. Each of the resistance elements may be also formed in different regions and isolated from each other by a P-N junction in the substrate.

Moreover, these resistance elements may be formed of a thin film of resistive layer. A resistive film is deposited upon the entire surface of the same substrate, such as glass and ceramic, by sputtering or evaporation techniques. The film is selectively etched by utilizing the mask according to this invention in order to form resistance elements.

Another embodiment of the invention is schematically illustrated in FIG. 5. The aim of this embodiment is to achieve high relative accuracy in the fabrication of n pairs of resistors consisting of nxn numbers of resistance elements (where n ≧ 3). In FIG. 5, nxn numbers of resistance elements $r_{11}, r_{12}, \ldots r_{n \cdot n-1}, r_{n \cdot n}$ of rectangular shape with widths and lengths equal to each other are disposed on a substrate in an n-row by n-column matrix. The mask cutting on the photomask art work used in the fabrication process is carried out in such manner that, as described by referring to FIG. 4, the straight line colinear with the sides of the resistance elements in the X-axis on the same coordinate defines the coordinate of the X-axis scale, and the straight line colinear with the sides of the resistance elements in the Y-axis on the same coordinate defines the coordinate of the Y-axis scale.

The mask obtained from the photomask art work formed in the above manner is used to fabricate n×n numbers of resistance elements by ion implantation, impurity diffusion, vapor deposition, or other suitable techniques. These resistance elements are connected as shown in FIG. 5 to form n pairs of resistors $r_1, r_2, \ldots r_n$. More specifically, each of n numbers of terminals $T_{1 \cdot 1}, T_{1 \cdot 2}, T_{1 \cdot 3}, \ldots T_{1 \cdot n}$ is respectively electrically connected with the first electrode of the resistance element of the first row, each n numbers of terminals $T_{2 \cdot 1}, T_{2 \cdot 2}, T_{2 \cdot 3}, \ldots T_{2 \cdot n}$ is respectively electrically connected with the second electrode of the resistance element of the n-th row, and the second electrode of each one resistance element belonging to each row is respectively electrically connected to the first electrode of each resistance element belonging to the adjacent row but belonging to a different column thereby to form a series connection of n numbers of resistance elements belonging to different columns between each one of terminals $T_{1 \cdot 1}, T_{1 \cdot 2}, T_{1 \cdot 3}, \ldots T_{1 \cdot n}$ and each one of terminals $T_{2 \cdot 1}, T_{2 \cdot 2}, T_{2 \cdot 3}, \ldots T_{2 \cdot n}$.

As shown in FIGS. 3 and 5, a pair of electrodes of each resistance element are formed at the same locations in each resistance element to provide substantially the same resistance value therebetween. Although electrodes are shown as points in these embodiments, they may have a striplike shape with a length near or equal to the width of the resistance element. Electrodes may be formed at or near the opposite side of the resistance element or at any locations in the resistance element, provided that their locations in the resistance element are the same.

According to the invention, the deviation in the mask cutting process is ideally compensated to make it possible to realize the highest relative accuracy in the fabrication of pairs of resistors on a substrate. At the same time, the deviation of resistance values ascribable to a temperature gradient on the semiconductor substrate is minimized.

In the above embodiment, n×n numbers of resistance elements are disposed in an n-row and n-column matrix. A plurality of such matrices may be disposed side by side or in cascade to form n pairs of resistors. In such structure, the deviations among values of each of n pairs of resistors are the sums of deviations among values of each of n pairs of resistors in each matrix, with the result that the relative accuracy is accordingly reduced as a whole.

While a few preferred embodiments of the invention have been described in detail, it is to be understood that this description is made only by way of example and not as a limitation on the scope of the invention.

TABLE 1

| | Example in prior art (FIG. 1) | Example in prior art (FIG. 2) | Example in invention (FIG. 3) |
|---|---|---|---|
| ΔR | $(\alpha_1 + \beta_2)/2$ | $\beta_2/2$ | $\alpha_3 \cdot \beta_3/4$ |
| ΔR max. when $\alpha\beta \leqq 1\%$ | 1% | 0.5% | 0.0025% |

What is claimed is:

1. An integrated circuit device comprising a plurality of substantially rectangular resistance elements each having first and second electrodes, said resistance elements being substantially equal both in width and in length to each other, said resistance elements being arranged in an n-row by n-column matrix (where n stands for an integer larger than 1), said first and second electrodes of each of said resistance elements being respectively provided at the same positions in each of said resistance elements, the upper sides of all of said resistance elements belonging to the same row of said matrix being colinear with a straight line, the lower sides of all of said resistance elements of the same row being colinear with a straight line, the right sides of all of said resistance elements belonging to the same column being colinear with a straight line, and the left sides of all of said resistance elements of the same column being colinear with a straight line, n numbers of first terminals respectively electrically connected with the first electrodes of the resistance elements of the first row, n numbers of second terminals respectively electrically connected with the second electrodes of the resistance elements of the n-th row, and means [for] respectively connecting the second electrodes of each of said resistance elements belonging to each row to the first electrodes of each of said resistance elements belonging to an adjacent row but belonging to a different column, thereby to form a series connection of n resistance elements belonging to different columns between each of said first terminals and each of said second terminals.

2. An integrated circuit device of claim 1, wherein all of said resistance elements are formed in the same substrate.

3. An integrated circuit device of claim 2, wherein said substrate is of semiconductor and said resistance elements are formed by introducing an impurity into said semiconductor substrate.

4. An integrated circuit device of claim 1, wherein all of said resistance elements are formed on one surface of a substrate.

5. A combination comprising four substantially rectangular resistance elements each having first and second electrodes, said resistance elements being substantially equal in width and in length to each other, said resistance elements being arranged in a 2-row by 2-column matrix, said first and second electrodes of each of said resistance elements being respectively provided at the same portions in each of said resistance elements, the upper sides of said resistance elements belonging to the same row being colinear with a straight line, the lower sides of said resistance elements of the same row being colinear with a straight line, the right sides of said resistance elements belonging to the same column being colinear with a straight line, and the left sides of said resistance elements of the same column being colinear with a straight line, and first, second, third, and fourth terminals, said first terminal being connected to said first electrode of said resistance element of the first row and the first column, said second terminal being connected to said first electrode of said resistance element of the first row and the second column, said third terminal being connected to said second electrode of said resistance element of the second row and the first column, and said fourth terminal being connected to said second electrode of said resistance element of the second row and the second column, said second electrode of said resistance element of the first row and the first column being connected to said first electrode of said resistance element of the second row and the second column, and said second electrode of said resistance element of the first row and the second column being connected to said first electrode of said resistance element of the second row and the first column.

6. [a] *A* combination comprising a plurality of substantially rectangular resistance elements each having first and second electrodes, said resistance elements each having first, second, third, and fourth sides, said resistance elements being substantially equal in width and in length to each other, said resistance elements being arranged in an n-row by n-column matrix (where n stands for an integer larger than 1), said first and second electrodes of each of said resistance elements being respectively provided at or near said first and second sides thereof, said first sides of said resistance elements belonging to the same row being colinear with a straight line, said second sides of said resistance elements of the same row being colinear with a straight line, said third sides of said resistance elements belonging to the same column being colinear with a straight line, and said fourth sides of said resistance elements of the same column being colinear with a straight line, n numbers of first terminals respectively electrically connected with the fist electrodes of said resistance elements of the first row, n numbers of second terminals respectively electrically connected with the second electrodes of said resistance elements of the n-th row, and means [for] connecting the second electrodes of each of said resistance elements belonging to an adjacent row but belonging to a different column, thereby to form a series connection of n resistance elements belonging to different columns between each of said first terminals and each of said second terminals.

* * * * *